Feb. 27, 1962    W. F. UNDERWOOD ETAL    3,023,126
METHOD OF BONDING A SYNTHETIC RESIN COATING TO A
POLYOLEFIN SURFACE AND ARTICLE PRODUCED THEREBY
Filed Jan. 12, 1959
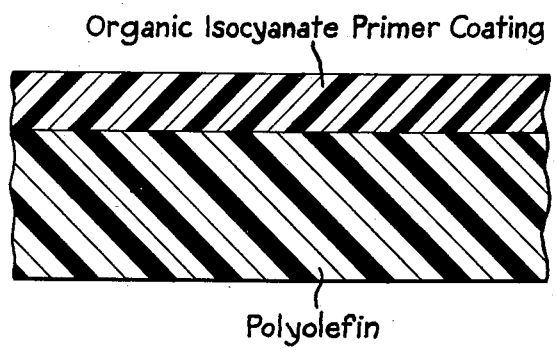
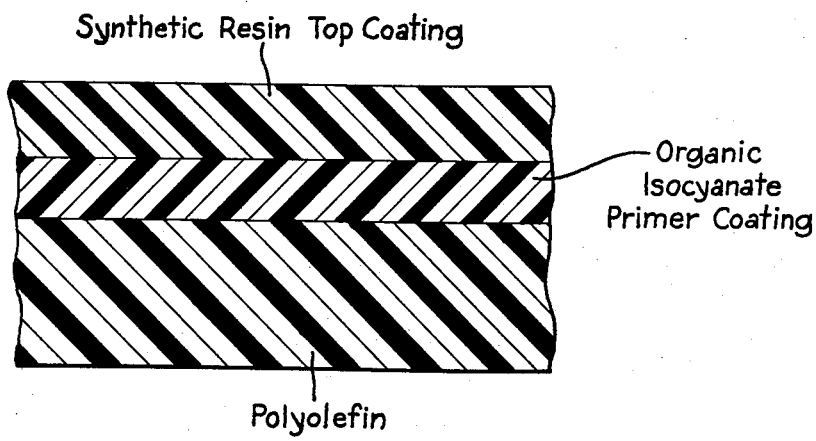
INVENTORS
WILLIAM F. UNDERWOOD
SUBBARAJU V. URS
BY
ATTORNEY

United States Patent Office 3,023,126
Patented Feb. 27, 1962

3,023,126
METHOD OF BONDING A SYNTHETIC RESIN COATING TO A POLYOLEFIN SURFACE AND ARTICLE PRODUCED THEREBY
William F. Underwood, Oak Park, Ill., and Subbaraju V. Urs, Cheshire, Conn., assignors to Union Carbide Corporation, a corporation of New York
Filed Jan. 12, 1959, Ser. No. 786,028
23 Claims. (Cl. 117—76)

This invention is concerned with improving the adhesion of coatings to surfaces of polymeric material. More particularly, the invention relates to forming highly adherent coatings on polyolefin surfaces.

Normally solid polyolefins such as polyethylene, polypropylene, polybutene, and the like are used in large amounts for the manufacture of film, injection or compression molded articles, and extruded items such as wire and cable insulation. It has been known for some time that polyolefin surfaces are poorly receptive to inks and other coatings, the adhesion of the dried ink or coating being usually of such low order that the coating can often be removed merely by vigorous rubbing.

Much attention has been given to the adhesion problem and various proposals have been made for pretreating the polyolefin surface to impart better receptivity thereto for various coating materials. For example, oxidation of the surface with chromic acid and other oxidizing solutions is described by Horton in U.S. Patent 2,668,134 and U.S. Reissue 24,062. Wolenski in U.S. Patent 2,715,075 describes treating polyethylene surfaces with ozone and a gaseous accelerator, and in U.S. Patent 2,715,076 with ozone and nitrous oxide, and in U.S. Patent 2,715,077 with nitrous oxide. Flame treatment of polyethylene surfaces is suggested by Kreidl in U.S. Patent 2,632,921. Chlorination of a polyethylene surface to improve adhesion of inks thereto is taught by Henderson in U.S. Patent 2,502,841. Subjecting polyethylene to the action of high voltage electric stress accompanied by corona discharge is described by Pierce and Potter in U.S. Patent 2,810,933. The use of corona discharge is also described in British Patent 715,914.

Although in general such pretreatments of polyolefin surfaces impart better adhesion thereto of coating materials, it has been observed that upon aging of the coated surfaces there is a progressive loss of the original adhesion values. Typically, polyethylene film subjected to high voltage electric stress accompanied by corona discharge and then coated with a commercial vinylidene chloride copolymer after aging for three months at normal temperatures shows an adhesion value of the coating to the polyethylene surface of less than ⅕ of the original adhesion value.

An object of this invention is to minimize changes in adhesion upon aging of coatings applied to polyolefin surfaces.

Another object is the application of an anchor or primer coating to polyolefin surfaces pretreated to impart receptivity to coatings by oxidation, flame, or high voltage electric stress and then applying a coating material to the primed surface.

A further object is the application to polyolefin surfaces pretreated to impart receptivity to coatings of a coating composition containing a major amount of coating material normally subject to loss of adhesion to a polyolefin surface upon aging and a minor amount of an agent stabilizing the coating material from loss of adhesion to the polyolefin surface.

Other objects will become apparent as the description of the invention proceeds.

According to the present invention, stable adherence of coatings on polyolefin surfaces which have been pretreated to impart receptivity to coating material is accomplished by applying to the pretreated polyolefin surface an anchor coating isocyanate composition such as an organic diisocyanate or a polyisocyanate, or a polyurethane containing an excess of isocyanate groups. The diisocyanate or its polymeric derivatives may be incorporated in the coating materials if desired, but it is preferred that the diisocyanate be applied as a primer or anchor coating to the polyolefin surface, followed by a superimposed coating of the desired coating material.

In the accompanying drawing:
FIG. 1 is an enlarged elevation in section, partially broken away, of a portion of polyolefin film coated with an isocyanate primer coating; and
FIG. 2 is an enlarged elevation in section, partially broken away, of a polyolefin film coated with an organic isocyanate primer coating and having superimposed thereover a synthetic resin top coating.

Representative of the organic diisocyanates suitable for primer coating of polyolefin surfaces are the aromatic diisocyanates such as 2,4-tolylene diisocyanate, methylene-bis-p,p'-phenylene diisocyanate, and 1,5-naphthalene diisocyanate; polymethylene diisocyanates, such as tetramethylene diisocyanate, pentamethylene diisocyanate, and hexamethylene diisocyanate; decamethylene diisocyanate; cycloalkylene diisocyanates, such as cyclohexylene 1,4-diisocyanate; diisocyanates containing hetero-atoms in the chain such as $OCN(CH_2)_2O(CH_2)_2NCO$ and

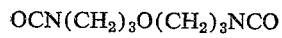

$OCN(CH_2)_3O(CH_2)_3NCO$ and mixed isocyanate-isothiocyanates, such as 1-isocyanate, 6-isothiocyanate hexane.

Polyisocyanates as exemplified by triphenylmethane triisocyanate, toluene triisocyanate, benzene triisocyanate, etc. are also suitable for primer coating of polyolefin surfaces.

Isocyanate compositions which are also useful and satisfactory as primer coatings for polyethylene surfaces are the polyurethanes produced by reaction of a diisocyanate with polyhydric alcohols such as ethylene glycol, 1,4-hexanediol, glycerine, and trimethylolpropane, the diisocyanate preferably being used in slight excess of the theoretical required amount to provide a terminal —N═C═O group on the polymer molecule. Suitable commercial polyurethanes include those known to the trade in Germany as the "Desmodurs" or "Igamide". For example, "Desmodur TH" is a resiniuos reaction product of 1 mol of trimethylolpropane, 1 mol of 1,4-hexanediol, and 5 mols of toluenediisocyanate (2,4= 60%+2,6= 40%) and "Igamid U" which is a polymeric reaction product of 1.004 mols of 1,6-hexamethylene diisocyanate and 1.0 mols of 1,4-butanediol.

Another class of polyurethanes suitable for use as primers in this invention are the polyester-urethanes, these being the reaction product of mixtures of diisocyanate and a polyester. The polyesters are esterification products of a dicarboxylic acid and a polyhydric alcohol and are exemplified by the German "Desmophens" including "Desmophen 300," a polyester of 3.0 mols phthalic anhydride and 4.1 mols trimethylolpropane or glycerine; "Desmophen 800," a polyester of 0.5 mol phthalic anhydride, 2.5 mols adipic acid, and 4.1 mols trimethylolpropane; "Desmophen 1100," a polyester of 3.0 mols adipic acid, 2.0 mols 1,4-butyleneglycol, and 2.0 mols hexanetriol.

The polyurethane can be modified by the addition of an ester-glycol to a mixture of polyhydric alcohol as illustrated by a polyurethane composed of 0.1125 mol of the ester-glycol reaction product of 1 mol adipic acid, 1 mol ethylene glycol, and 1 mol 1,2-propylene glycol, 0.05 mol 1,4-butanediol, 0.0167 mol 2,5-hexanediol, 0.1167 mol diethylene glycol, and from 0.3 to 0.345 mol hexamethylene-diisocyanate, the latter being employed in slight excess over stoichiometric quantities, but not to exceed about 15 mol percent of the ester glycols and the diols, in order to control cross-linking properties of the compositions.

The isocyanate compositions are best applied to polyolefin surfaces in the form of dilute solutions in volatile organic solvents. A concentration of about 0.5 to about 20 percent by weight of the diisocyanate or its derivatives in a suitable solvent is generally suitable, but 0.75 to about 15 percent is preferred. Numerous solvents are known for the diisocyanates and their derivatives, including cyclohexanone, acetone, methyl ethyl ketone, chloroform, carbon tetrachloride, pyridine, mesityl oxide, cyclohexanol, methyl acetate, ethyl acetate, butyl acetate, and methyl chloride. Solvents other than those enumerated can also be used if desired.

It is obvious that the primer coating be of thickness sufficient to impart improvement in adhesion values. Thicknesses of 0.005 mil or greater can be used. It is preferred that the primer thickness be 0.5 mil or less since greater thicknesses do not further appreciably improve adhesion values.

The primer coating can be applied by any convenient coating method, such as dipping, spraying, brushing, or roller coating, and may be doctored if necessary.

After application of the primer coating to the polyolefin surface, the coating can be dried at room temperatures or at moderate temperatures not high enough or too prolonged to cause any adverse effects to the polyolefin film.

In the instance of a coated polyethylene surface, moderate drying temperatures are of the order of 60° C. to about 80° C., and preferably a drying temperature from 70° C. to 75° C. Such heating means as radiant heat, hot air either by convection or forced, dielectric heating, and the like are all suitable for this purpose.

It is to be understood that the polyethylene film coated only with primer coatings such as polyurethanes, polyester-urethanes, etc., can be used as a wrapping and packaging material. In that embodiment it is preferred to expose the coated polyethylene film to a reactive material to destroy the excess isocyanate groups. Heating by steam may be used to combine drying the coating and destroying the excess reactive groups.

In that embodiment wherein the primer coated film is to be top coated, after the primer coating is applied, care should be taken to prevent undue exposure to reactive materials such as water, amines, and the like to insure the retention of sufficient isocyanate groups to react with the coating material to improve the adhesion.

After application and drying of the primer coating, a top or final coat of a suitable coating material can be applied to the primer coated polyolefin surface. Suitable finish coating materials include those containing as their principal vehicle vinyl polymers, such as polyvinyl chloride; copolymers of vinyl chloride and of esters, as for example vinyl acetate, methyl acrylate, butyl acrylate, diethyl fumarate, and diethyl maleate; copolymers of vinyl chloride and of vinyl alkyl ethers such as vinyl isobutyl ether and vinyl ethyl ether; copolymers of vinyl chloride, vinyl ester, and a small amount of an unsaturated polycarboxylic acid such as maleic as more particularly described in U.S. Patent 2,329,456; polyvinyl alcohol; methacrylate polymers such as polymethylmethacrylate and polyethylmethacrylate; and polyamides such as the nylons, include polyhexamethylene diamine adipate and poly epsilon caprolactam; and vinylidene chloride polymers and copolymers.

The finish or top coatings can be clear or pigmented as desired. The choice of a particular top coating is dependent upon the need of its specific properties for modifying the polyolefin surface. For example, the saran resins (vinylidene chloride copolymers) have been used to coat polyethylene film to increase its resistance to various oils such as cottonseed oil, cod liver oil, and mineral oil; and polyethylene coated with a copolymer of vinylidene chloride and acrylonitrile has a considerably lower permeability to gases including air, oxygen, nitrogen, and carbon dioxide than the uncoated polyethylene film. Resistance of coated polyethylene film to excessive permeability by such gases is highly desirable in the vacuum packaging of foodstuffs, particularly processed meats.

The top or finish coat, in addition to the polymer vehicle, can contain stabilizers, plasticizers, and solvents.

The polymer coating composition can be in the form of solvent solutions, aqueous solutions, aqueous emulsions, plastisols, organosols, which are suspensions of finely divided polymer particles in a mixture of solvents and non-solvents.

As with the primer coatings, the finish coatings can be applied to the primer coated polyolefin surface by any suitable method, including spraying, brushing, dipping, doctoring, or roller coating. After application, the finished coatings are dried at normal room temperatures or may be force dried at an elevated temperature previously described for the primer coating.

Although the preferred practice of this invention is to first apply the primer coating and thereafter the finish coating, good adhesion results can also be had by mixing a small amount of a diisocyanate with the polymeric finish coating. In such instance the diisocyanate when used in amounts between 0.25 and about one percent by weight of the polymer latex is compatible with the polymer and imparts desirable aging properties with respect to retention of original adhesion values of the coating to the polyolefin surface.

Specific embodiments of the invention are described in the following examples, it being understood, however, that they are in illustration of the invention and not in limitation thereof other than as set forth in the appended claims.

EXAMPLES 1 to 6

In the following examples, 1 to 6, the primer or subcoating and the finish coating were applied as follows:

Commercial polyethylene film of 1.5 mil thickness was treated by subjecting the surface of the film to high voltage electric stress accompanied by corona discharge. Individual samples of the film were dipped into a solution of tolylene diisocyanate in cyclohexanone of different concentrations as set forth in subsequent Table I. The diisocyanate coated film was removed and the excess tolylene diisocyanate (TDI) solution was allowed to drain for several seconds or long enough to eliminate excessive dripping and thereafter dried by placing the film between spaced electrically conductive glass panels for a period of 30 minutes. The temperature as measured by a glass thermometer inserted between the glass panels was 60° C.–65° C. The resultant dried diisocyanate coating ranged from 0.01 mil to 0.05 mil in thickness on each side. The coated film was then dipped into a 52 percent by weight solids content aqueous latex of an internally plasticized vinylidene chloride-vinyl chloride copolymer having a viscosity of 9.2 centipoises at 23° C. and a specific gravity of 1.250 at 25° C. (Dow Chemical Company X–2105). The excess emulsion was removed by a doctor blade. The copolymer coated film was then dried by the same procedure described above except that the temperature was maintained at 70° C.–75° C. for 30 minutes. The thickness of the vinylidene chloride-vinyl chloride copolymer coating ranged from 0.05 mil to 0.10 mil on each side as measured by means of a thickness gauge.

Subsequent Table I shows the improvements in adhesion values effected by the primer coating, particularly upon aging as compared to control samples which were not primed but directly coated with the vinylidene copolymer.

TABLE I

*Effect of subcoating polyethylene with tolylene-diisocyanate (TDI) on the adhesion of vinylidene chloride copolymer to polyethylene*

| Ex. | Percent by weight concentration of TDI in subcoat solution | Adhesion[1] values after periods of— | | | | | | | |
|---|---|---|---|---|---|---|---|---|---|
| | | One hour | | Two weeks | | One month | | Three months | |
| | | Sub-coated | Control | Sub-coated | Control | Sub-coated | Control | Sub-coated | Control |
| 1 | 0.75 | 130 | 120 | 126 | 65 | 135 | 38 | 153 | 23 |
| 2 | 1.0 | 98 | 120 | 125 | 65 | 120 | 38 | 105 | 23 |
| 3 | 2.0 | 145 | 120 | 145 | 65 | 140 | 38 | 135 | 23 |
| 4 | 5.0 | 145 | 120 | 175 | 65 | 170 | 38 | 155 | 23 |
| 5 | 10.0 | 200 | 120 | 198 | 65 | 210 | 38 | 265 | 23 |
| 6 | 15.0 | 175 | 120 | 210 | 65 | 200 | 38 | 275 | 23 |

[1] Coating adhesion is defined as the average force in grams necessary to strip a scored segment of the coating from the base film. A piece of coated film 4 inches wide and 12 inches long is laid with the coated side uppermost upon a movable cart having a porous surface. A vacuum is applied to the underside of the porous cart surface to secure the film thereto. A strip of conventional pressure-sensitive cellophane tape ½ inch wide and 10 inches long is applied parallel to the longitudinal direction of the film. The coating is then scored along the edges of the cellophane adhesive tape to a depth sufficient to penetrate through the coating but insufficient to penetrate through the base film. Separation of the coating is then initiated at one end of the cellophane tape and the tape is folded back and attached to a spring scale. The cart is moved away from the scale at 12.8 inches per minute and the average force necessary to separate the coating is recorded. The average force per centimeter is determined by dividing the recorded force by the width of the tape.

EXAMPLES 7–9

In the following examples, 7 to 9, the method used was as follows:

Commercial polyethylene film 1.5 mils in thickness was treated by subjecting the surface of the film to high voltage electric stress accompanied by corona discharge. Individual samples of the treated film were prime coated by being dipped into compositions containing different amounts of tolylene diisocyanate admixed with a latex of an internally plasticized vinylidene chloride-vinyl chloride copolymer (Dow Chemical Company X-2105) as set forth in subsequent Table II. The dipped film was removed from the composition and excess composition was removed by doctoring. The coated polyethylene film was dried by placing the film between spaced electrically conductive glass panels for a period of 30 minutes. The temperature, as measured by a glass thermometer inserted between the glass panels was 70° C.–75° C. The resultant coating thickness ranged from 0.05 mil to 0.1 mil on each side.

Subsequent Table II compares the improved adhesion values obtained with the copolymer in admixture with the diisocyanate as compared to a control sample coated only with the vinylidene chloride copolymer.

TABLE II

*Effect of incorporating tolylene-diisocyanate (TDI) into Saran latex X–2105 on the adhesion of Saran to polyethylene*

| Ex. | Percent TDI in Saran latex | Adhesion values after periods of— | | | | | | | |
|---|---|---|---|---|---|---|---|---|---|
| | | One hour | | Two weeks | | One month | | Three months | |
| | | Anchored | Control | Anchored | Control | Anchored | Control | Anchored | Control |
| 7 | 1.0 | 133 | 91 | 130 | 40 | 135 | 25 | 133 | 20 |
| 8 | 0.5 | 110 | 91 | 117 | 40 | 127 | 25 | 120 | 20 |
| 9 | 0.25 | 107 | 91 | 107 | 40 | 109 | 25 | 100 | 20 |

EXAMPLE 10

Polyethylene film which had been treated by subjecting the surface of the film to high voltage electric stress accompanied by corona discharge, and being 1.5 mils thick, was dipped into a 7.5 percent by weight solution of modified polyurethane prepared by condensing together for six hours at a reflux temperature (circa 155° C.) 0.1125 mol of an ester glycol (obtained by reacting together 1 mol adipic acid, 1 mol ethylene glycol, and 1 mol 1,2-propylene glycol), 0.05 mol 1,4-butanediol, 0.0167 mol 2,5-hexanediol, 0.1167 mol diethylene glycol and 0.3316 mol hexamethylene diisocyanate in pyridine. The polyethylene film was removed and the excess polyurethane solution on its surface was allowed to drain off. The polyurethane coated polyethylene film was dried by placing the film between spaced electrically conductive glass panels for a period of 30 minutes. The temperature, as measured by a glass thermometer inserted between the glass panels was 70° C.–75° C. The resultant coating thickness ranged from 0.05 mil to 0.10 mil on each side. The coated film was then dipped into a 52 percent by weight solids content latex of an internally plasticized vinylidene chloride-vinyl chloride copolymer (Dow Chemical Company X-2105). The coated film was removed from the latex emulsion and excess emulsion was removed by doctoring. The coated polyethylene film was then dried by the same procedure described above. The thickness of the vinylidene chloride-vinyl chloride copolymer coating ranged from 0.05 mil to 0.10 mil on each side. The coating could not be peeled from the polyethylene film by the aforedescribed test with pressure sensitive cellophane tape, and even after three months aging the coating was still resistant to peeling by pressure sensitive tape.

EXAMPLES 11 TO 13

In these examples 11 to 13, the method used was the same as for Examples 1 to 6, namely the commercial polyethylene film was dipped into a 2 percent by weight solution of tolylene diisocyanate in cyclohexanone followed by coating with the specific polymeric materials as enumerated in Table III hereinafter. The control samples in said Table III were directly coated with the specific polymers under the same conditions but with omission of the diisocyanate primer coating.

TABLE III

| Ex. | Polymer | Adhesion values after periods of— | | | | | |
|---|---|---|---|---|---|---|---|
| | | One hour | | Three days | | Seven days | |
| | | Sub-coated | Control | Sub-coated | Control | Sub-coated | Control |
| 11 | Polyvinyl chloride [a] | 68 | 38 | 70 | 29 | 70 | 29 |
| 12 | Polyvinyl alcohol [b] | 82 | 50 | 95 | 29 | 95 | 25 |
| 13 | Polyamide [c] | ([1]) | 210 | ([1]) | 170 | ([1]) | 35 |

[1] Does not peel.
[a] "Marvinol VR-10," a commercial polyvinyl chloride supplied by Naugatuck Chemical Co., having a specific viscosity of 0.52 as determined at 25° C. on a solution of 0.4 gram polymer/100 cc. nitrobenzene. It was applied to the polyethylene film as a 5 percent by weight solution in cyclohexanone.
[b] "Elvanol 71–30," a commercial polyvinyl alcohol supplied by the Du Pont Co. and which in a 4 percent by weight aqueous solution has a viscosity of 28–32 centipoises at 20° C. It was applied to the polyethylene film as a 5 percent by weight solution in water.
[c] "Nylon-FM 6503," a commercial polyamide supplied by the Du Pont Co.; it melts at 179° C. and at 200° C. has a melt viscosity of approximately 25,000 poises. The polyamide was applied to the polyethylene film as a 10 percent by weight solution in a 70 percent ethanol—30 percent water mixture.

EXAMPLE 14

In this example the polyethylene film and method used were the same as for Examples 7 to 9 wherein the anchor-coating material was incorporated into the polymer solution before applying to the polyethylene surface. The coating composition was a 5 percent by weight solution of polyvinyl chloride (Marvinol VR-10) in cyclohexanone containing 1 part by weight of tolylene diisocyanate per 99 parts polyvinyl chloride. A control sample was coated with the same polyvinyl chloride resin solution containing no diisocyanate.

TABLE IV

*Effect of incorporating tolylene-diisocyanate (TDI) into polyvinyl chloride solution on the adhesion of the polymer to polyethylene*

| Example | Percent TDI in polyvinyl chloride | Adhesion values after aging three days | |
|---|---|---|---|
| | | Anchored | Control |
| 14 | 1 | 70 | 29 |

Although the previous examples have illustrated the coating treatment of this invention applied to polyolefins in the form of film, other forms such as molded articles as exemplified by bottles or extruded shapes such as cable jackets can be similarly provided with coating remaining strongly adherent upon aging.

With polyolefin articles of relatively rigid character and of non-uniform surface contours such as bottles and the like, it is generally more convenient to pretreat the polyolefin surface by oxidizing agents such as ozone, chromic acid, and other oxidizing solutions or reagents than by flame or corona discharge techniques. Application of strongly adherent coatings to injection molded polyethylene articles is illustrated in the subsequent example.

EXAMPLE 15

Polyethylene bottles whose exposed surfaces had been oxidized by treatment with chromic acid to render them receptive to coatings were dipped into a 2 percent by weight solution of tolylene diisocyanate in cyclohexanone and after withdrawal were dried at 67° C. temperature for 90 minutes. One group of bottles was top coated with a vinylidene chloride copolymer latex (Saran X-2105 supplied by Dow Chemical Co.) and the other group was top coated with a 5 percent aqueous solution of polyvinyl alcohol (Elvanol 71-30) supplied by the Du Pont Co. A third and fourth group of polyethylene bottles whose surfaces had been oxidized with chromic acid but not thereafter prime coated with the diisocyanate were similarly coated with the Saran latex and the polyvinyl alcohol respectively to serve as controls. In all instances the top coatings were dried for 180 minutes at 71° C. The average adhesion values were then determined for each group of control bottles upon aging for various periods of time. In subsequent Table V it will be noted that not only are the original adhesive values higher for the bottles surface primed with the diisocyanate than the control sample bottles, but that the diisocyanate primed sample bottles substantially retained such values whereas the control samples suffered a rapid loss of adhesion.

TABLE V

*Effect of subcoating polyethylene bottles with tolylene-diisocyanate on the adhesion of polymers to bottles*

| Polymer | Adhesion values after periods of— | | | | | |
|---|---|---|---|---|---|---|
| | One hour | | Three days | | Seven days | |
| | Sub-coated | Control | Sub-coated | Control | Sub-coated | Control |
| Saran (Dow's X-2105) | 195 | 185 | 177 | 100 | 130 | 22 |
| Polyvinyl alcohol (Du Pont's 71-30) | (¹) | 300 | (¹) | 250 | (¹) | 210 |

¹ Does not peel.

Printing inks were made to adhere tenaciously to the surface of polyethylene film provided the polyethylene film is subcoated with tolylene diisocyanate. Definite improvement in adhesion was observed over standard printing inks which were printed on polyethylene film which was not subcoated. This method did not deleteriously affect the nature or appearance of the print, nor did it detract from the glossiness of the print.

It will be appreciated by persons skilled in the art that various changes and modifications can be made in the invention described supra without departing from the nature and spirit thereof. Accordingly, this invention is not restricted to said description except as set forth in the appended claims.

What is claimed is:

1. A method for applying to a polyolefin surface coatings resistant to loss of adhesion upon aging which comprises applying to a coating-receptive polyolefin surface a primer coating of an organic isocyanate containing a terminal isocyanate group —N=C=O and selected from the group consisting of diisocyanates, polyisocyanates, polyurethanes, and polyester-urethanes.

2. In a method according to claim 1 wherein the organic isocyanate is in admixture with a resin selected from the group consisting of vinyl chloride polymers, vinylidene chloride polymers, polyvinyl alcohol, and nylon.

3. In a method for applying to a polyolefin surface a top coating resistant to loss of adhesion to the polyolefin surface upon aging, the steps which comprise applying to a coating-receptive polyolefin surface a primer coating comprising a solution in a volatile organic solvent of an organic isocyanate compound containing a terminal isocyanate group —N=C=O and selected from the group consisting of diisocyanates, polyisocyanates, polyurethanes, and polyester-urethanes, drying said primer coating and thereafter applying over said primer coating a top coating containing as the vehicle a synthetic resin.

4. Method according to claim 3 wherein the top coating contains a polymer selected from the group consisting of vinyl chloride polymers, vinylidene chloride polymers, polyvinyl alcohol, and nylon.

5. Method according to claim 3 wherein the dried primer coating is between 0.000005 and 0.0001 inch thick.

6. Method according to claim 5 wherein the primer coating has a thickness between 0.000005 and 0.0005 inch.

7. Method according to claim 3 wherein the primer coating is force dried at temperatures from about 60° C. to 80° C.

8. Method according to claim 3 wherein the primer coating is dried in the substantial absence of moisture vapor.

9. Method according to claim 3 wherein the coating receptive polyolefin surface is an oxidized polyethylene surface.

10. Method according to claim 3 wherein the primer coating comprises an aliphatic diisocyanate.

11. Method according to claim 3 wherein the primer coating comprises an aromatic diisocyanate.

12. Method according to claim 3 wherein the primer coating comprises a polyisocyanate.

13. Method according to claim 3 wherein the primer coating comprises a polyester-urethane.

14. Method according to claim 3 wherein the top coating contains a copolymer of vinylidene chloride and vinyl chloride.

15. Method according to claim 3 wherein the top coating contains nylon resin.

16. Method according to claim 3 wherein the top coating contains polyvinyl alcohol.

17. Method according to claim 3 wherein the top coating contains a vinyl chloride polymer.

18. Method according to claim 3 wherein the top coating contains a vinylidene chloride polymer.

19. A polyolefin article having a coating-receptive surface coated with a primer coating of an organic isocyanate containing a terminal isocyanate group

—N=C=O and superimposed over said primer coating, a top coating containing as the vehicle a synthetic resin.

20. A coated polyolefin article according to claim 19 wherein the primer coating has a thickness between 0.000005 and 0.0001 inch.

21. A coated polyolefin article according to claim 19 wherein the synthetic resin of the top coating contains a polymer selected from the group consisting of vinyl chloride polymers, vinylidene chloride polymers, polyvinyl alcohol, and nylon.

22. A polyolefin article having a coating-receptive surface coated with a primer coating containing an organic isocyanate containing a terminal isocyanate group

—N=C=O and selected from the group consisting of diisocyanates, polyisocyanates, polyurethanes, and polyester-urethanes.

23. A coated polyolefin article according to claim 22 wherein the organic isocyanate is in admixture with a vinylidene chloride-vinyl chloride copolymer.

References Cited in the file of this patent

UNITED STATES PATENTS

| | | | |
|---|---|---|---|
| 2,826,526 | Meyrick | | Mar. 11, 1958 |
| 2,918,394 | Smith | | Dec. 22, 1959 |

Notice of Adverse Decision in Interference

In Interference No. 93,689 involving Patent No. 3,023,126, W. F. Underwood and S. V. Urs, Method of bonding a synthetic resin coating to a polyolefin surface and article produced thereby, final judgment adverse to the patentees was rendered Oct. 15, 1964, as to claims 1 and 22.

[*Official Gazette December 22, 1964.*]